UNITED STATES PATENT OFFICE.

JOHN PRIDHAM, OF NEW BRUNSWICK, NEW JERSEY, ASSIGNOR TO HORACE H. DAY, OF SAME PLACE.

USE OF OXIDE OF TIN IN THE MANUFACTURE OF INDIA-RUBBER.

Specification forming part of Letters Patent No. 7,196, dated March 19, 1850.

*To all whom it may concern:*

Be it known that I, JOHN PRIDHAM, of New Brunswick, in the county of Middlesex and State of New Jersey, chemist and druggist, have invented a new and useful Composition of Rubber, which, when submitted to the action of a high degree of heat, will produce a black fabric without the addition of lamp-black, and which has also all the advantages which distinguish vulcanized rubber from the natural rubber or old preparation, and which, when long exposed to the atmosphere, does not become hard or brittle, as is the case with rubber combined with lead and its preparations, of which the following is a specification.

It is well known that most preparations of rubber require the admixture of lamp-black or other black pigment to impart a black color. All these impair the strength and durability of the fabric in proportion to the quantity used. The only benefit in any sense derived from these black powders is to produce a black surface, their use being otherwise injurious. By my invention all black powders are dispensed with, and yet the color is black, producing a better fabric than ever before obtained.

My invention consists in mixing and combining tin, in a state of powder, with rubber, and vulcanizing the same by the use of sulphur exposed to high heat, according to the well-known process of vulcanizing rubber. Rubber fabrics prepared in this manner are insoluble, not liable to become hard by extreme cold or soft by heat, and retain black color.

To enable others skilled in the manufacture of india-rubber to use my invention, I proceed to describe my process of manufacturing the same.

I take forty-eight parts of india-rubber rendered plastic by the usual methods of mastication in heated cylinders, to which I add five parts of oxide of tin, commonly called "polishing-putty." These, being well mixed and mechanically combined, may be rolled upon cloth or into sheets by the well-known process of grinding and spreading rubber, and then made into clothing, shoes, tents, and other similar fabrics, according to the manner well known to all manufacturers of rubber goods. These are then to be dusted over with powdered sulphur, and thus exposed to high heat—from 270° to 300° Fahrenheit—for a period of time extending from three to six hours, according to the thicknesss of fabric. Either dry or steam heat will answer and produce a perfect result. I prefer, however, steam confined in a suitable chamber, as is well known to workmen in this branch of art. To remove any metallic bloom from the surface, together with any portions of sulphur which may not have passed off in vapor, the fabric should be washed in a bath of strong alkali for one hour, more or less, when they may be dried and are ready for market. When very thick bodies of material are required in one piece I find the vulcanizing is best done in a chamber heated by steam under pressure; and for coarse purposes—such as springs for railroad-cars, elastic packing, and such thick articles—a small portion of sulphur—say eight per cent., by weight, to the quantity of rubber—should be incorporated during the process of grinding with the rubber and tin. Under this arrangement no sulphur need be added to the surface.

If the fabric to be made is required more ductile, and in all cases where great strength and elasticity are not requisite, a larger proportion of the powders of tin may be added, the exact quantity not being material. I have found all preparations of tin—such as the salts and granulations—will produce good fabrics, and intend to embrace them in my claim. That which I use generally and find best is the oxide. I sometimes mix pipe-clay, ocher, and other similar cheap earthy matters to cheapen the compound. Under these circumstances the fine black surface which distinguishes the rubber and tin compounded alone is partially destroyed by the last-mentioned mixtures.

Having described the nature of my invention, together with the best mode of manufacturing the same, I hereby declare that I do not claim the combining of ochers or pipe-clay with india-rubber, nor submitting rubber to high heat, nor mixing sulphur with rubber.

What I do claim as my invention, and desire to secure by Letters Patent, is—

The combining rubber with tin, as set forth, and the combination of these with sulphur and heat, whereby I produce a fabric having a black surface, and which is capable of withstanding all the elements which distinguish vulcanized from other preparations of rubber.

JOHN PRIDHAM.

Witnesses:
 N. WOORAM,
 JAS. G. MCDOWELL.